United States Patent
Koe

(10) Patent No.: US 7,043,591 B2
(45) Date of Patent: *May 9, 2006

(54) CROSS SWITCH SUPPORTING SIMULTANEOUS DATA TRAFFIC IN OPPOSING DIRECTIONS

(75) Inventor: Wern-Yan Koe, Cupertino, CA (US)

(73) Assignee: LSI Logic Corporation, Milpitas, CA (US)

( * ) Notice: Subject to any disclaimer, the term of this patent is extended or adjusted under 35 U.S.C. 154(b) by 192 days.

This patent is subject to a terminal disclaimer.

(21) Appl. No.: 10/717,083

(22) Filed: Nov. 19, 2003

(65) Prior Publication Data

US 2005/0108457 A1 May 19, 2005

(51) Int. Cl.
*G06F 13/36* (2006.01)

(52) U.S. Cl. ............... 710/306; 710/305; 710/310

(58) Field of Classification Search ............ 710/1–317
See application file for complete search history.

(56) References Cited

U.S. PATENT DOCUMENTS

| | | | |
|---|---|---|---|
| 5,859,988 A * | 1/1999 | Ajanovic et al. | 710/306 |
| 6,314,484 B1 * | 11/2001 | Zulian et al. | 710/306 |
| 6,460,108 B1 * | 10/2002 | McCoskey et al. | 710/310 |
| 6,662,260 B1 * | 12/2003 | Wertheim et al. | 710/316 |
| 6,816,934 B1 * | 11/2004 | Riley et al. | 710/113 |
| 6,889,275 B1 * | 5/2005 | Vandecappelle et al. | 710/107 |
| 2002/0083255 A1 * | 6/2002 | Greeff et al. | 710/305 |

* cited by examiner

*Primary Examiner*—Rehana Perveen
*Assistant Examiner*—Brian Misiura
(74) *Attorney, Agent, or Firm*—Christopher P Maiorana PC

(57) ABSTRACT

An apparatus comprising a first bus segment, a second bus segment and a switch. The first bus segment may be configured to transfer data in either a first direction or a second direction. The second bus segment may be configured to transfer data in either the first direction or the second direction. The switch may be connected between the first bus segment and the second bus segment. The switch may be configured to transfer data in both the first direction and the second direction simultaneously.

20 Claims, 3 Drawing Sheets

CROSS SWITCH SUPPORTING SIMULTANEOUS DATA TRAFFIC IN OPPOSING DIRECTIONS

FIELD OF THE INVENTION

The present invention relates to a data transmission generally and, more particularly, to a cross switch supporting simultaneous data traffic in opposing directions.

BACKGROUND OF THE INVENTION

Referring to FIG. 1, a conventional system 10 with several components A–D is shown. The system 10 transfers data on a shared bus 20. A path 22a illustrates data moving from a transmitter (i.e., component A) to a receiver (i.e., component B). The components A–D can behave as either a transmitter or a receiver, but not both simultaneously. For example, a path 22b illustrates data moving from a transmitter (i.e., component B) to a receiver (i.e., component A). The paths 22c and 22d show similar configurations of the component C and the component D. There may be a period of time for a particular one of the components A–D to switch from being a receiver to transmitter, and vice versa. That period of time is measured in idle cycles of a system clock.

For example, a bus structure can multiplex addresses and a data over the bus 20. With such an implementation, the component A can read from the component B by first sending an address over the bus 20. The component B receives the address, decodes the address information, fetches the requested data, and sends the requested data back on the bus 20. The sequence of operations described creates the bus idle cycles where other components do not have access to the bus 20.

During the bus idle cycles, if the component C needs to read from the component D, the bus 20 is not available. In addition, the bus 20 normally only runs at one clock frequency. All of the components A–D need to interface to the bus 20 at the frequency of the bus 20. Conventional solutions resolve such multiple bus requests by waiting for the bus 20 to be available by adding idle cycles to separate the bus activity.

It would be desirable to implement a bus that implements simultaneous data traffic in opposing directions without imposing idle cycles.

SUMMARY OF THE INVENTION

The present invention concerns an apparatus comprising a first bus segment, a second bus segment and a switch. The first bus segment may be configured to transfer data in either a first direction or a second direction. The second bus segment may be configured to transfer data in either the first direction or the second direction. The switch may be connected between the first bus segment and the second bus segment. The switch may be configured to transfer data in both the first direction and the second direction simultaneously.

The objects, features and advantages of the present invention include providing a switch that may (i) support simultaneous data traffic in opposing directions, (ii) reduce idle cycles, (iii) increase bus bandwidth and performance and/or (iv) support components that run at different bus frequencies.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

Figure 1:
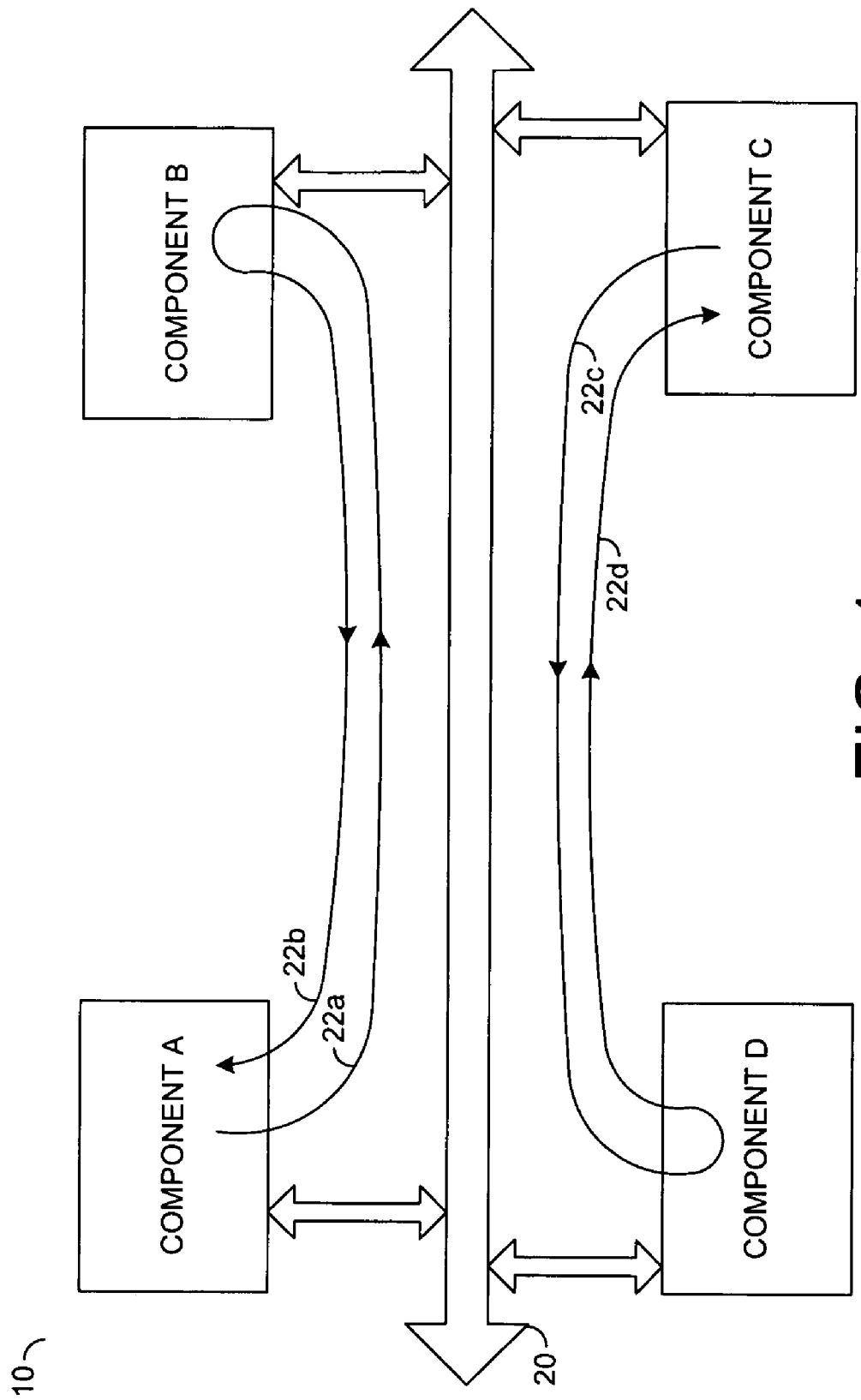
FIG. 1 is a diagram illustrating a conventional bus configuration.
Figure 2:
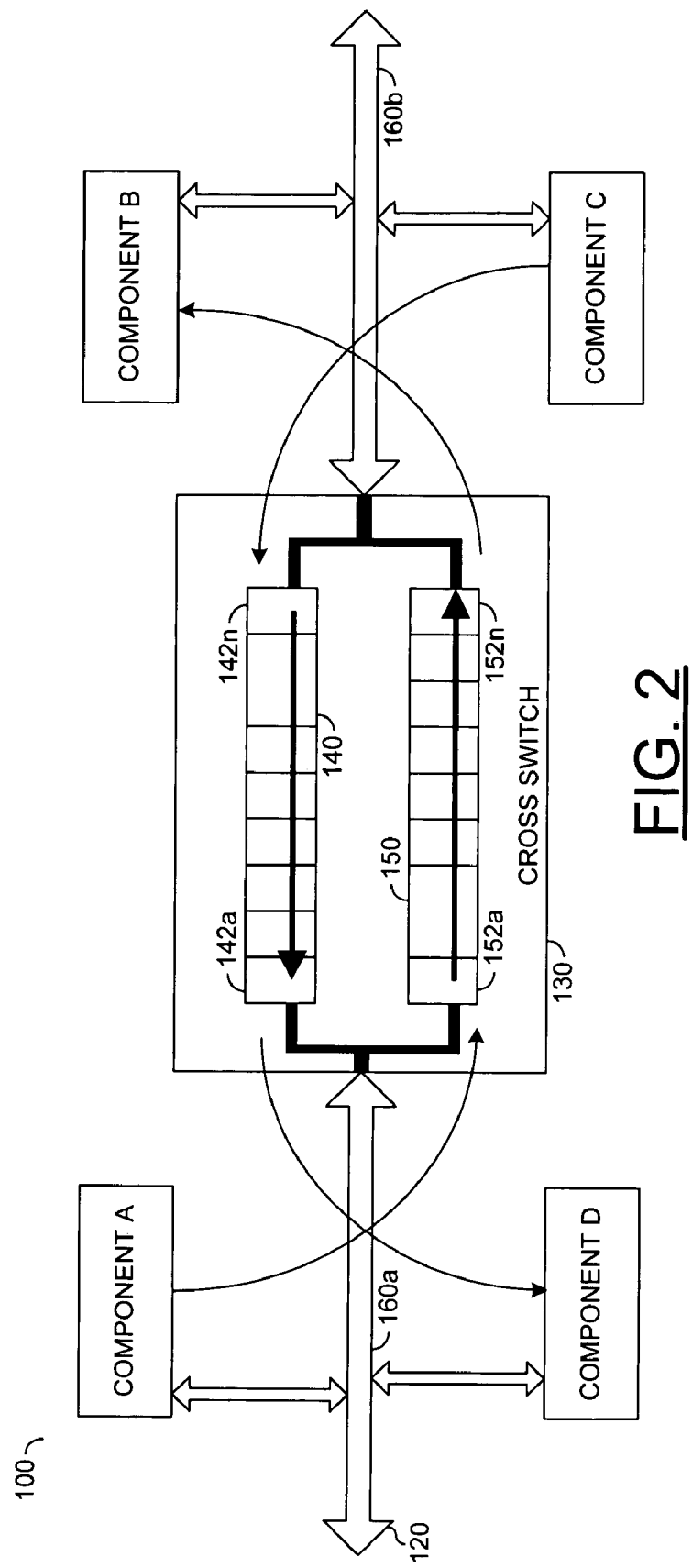
FIG. 2 is a diagram illustrating a preferred embodiment of the present invention.

Referring to FIG. 2, a diagram of a system 100 is shown in accordance with the preferred embodiment of the present invention. The system 100 generally comprises a bus 120, a switch 130 and a number of components A–D. In one example, the switch 130 may be a cross switch (or switch box). The switch 130 generally comprises a portion (or buffer) 140 and a portion (or buffer) 150. The portion 140 may accommodate bus traffic in one direction, while the portion 150 may accommodate bus traffic in another direction. For example, traffic from the component C to the component D may be transferred along the first portion 140. Traffic from the component A to the component B may be transferred along the second portion 150. The first portion 140 may be implemented as a number of memory cells 142a–142n. The second portion 150 may be implemented as a number of memory cells 152a–152n. The first portion 140 and the second portion 150 may be implemented as first-in, first-out (FIFO) buffers.

The switch 130 may be implemented between segments of the bi-directional bus 120. A first segment 160a may be implemented on one side of the switch 130. A second segment 160b may be implemented on another side of the switch 130. The switch 130 may be inserted between the first segment 160a and the second segment 160b. While two segments are shown connected to the switch 130, additional segments may be connected to meet the design criteria of a particular implementation. The component A and the component D may be connected to the segment 160a. The component B and the component C may be connected to the segment 160b. When the component A is requesting data (e.g., REQUESTA) from the component B, the component C is allowed to request data (e.g., REQUESTC) from the component D. The switch 130 will then normally transfer the data request REQUESTA from segment 160a to the segment 160b, and the data request REQUESTC from the segment 160b to the segment 160a, simultaneously.

When the component B receives the data request REQUESTA, the component B takes the idle cycles to fetch data (e.g., DATAB). At the same time, the component D may have received the data request REQUESTC. The component D may also use the respective idle cycles to fetch the data DATAD. The component B and the component D put respective data on segment 160b and the segment 160a of the bus 130. Again, the switchbox 130 forwards the data DATAB to the segment 160a and the data DATAD to the segment 160b at the same time.

Furthermore, the component A and the component C do not necessarily have to make the appropriate data requests simultaneously. Similarly, the data DATAB and the data DATAD do not necessarily have to be put on the respective segment of the bus 130 simultaneously. The switch 130 may be implemented as two buffers 140 and 150. The buffer 140 may connect one input from the segment 160a and present an output to the segment 160b. The buffer 150 may operate in the reverse direction. The switch 130 holds the data that arrives early, waits for the other segment (e.g., the segment 160a or the segment 160b) to be available, then presents data from one segment (e.g., the segment 160a) to the other segment (e.g., 160b).

The switch 130 may hold data from one segment (e.g., 160a) before forwarding the data to the other segment (e.g., 160b). The size (e.g., depth and width) of the buffers 140 and 150 may be adjusted to meet the design criteria of a particular implementation. The switch 130 may also allow simultaneous access from two independent components (e.g., the components A and D) to two other components (e.g., the components B and C). In one example, the segment 160a and the segment 160b may operate at the same frequency. In another example, the segment 160a may operate at a first frequency and the segment 160b may operate at a second frequency. The first frequency may be the same, greater than or less than the second frequency.

The system 100 may be extended into multiple segments with multiple buffers and forwarding logic. The system 100 may (i) reduce idle cycles, (ii) increase bus bandwidth and performance, (iii) support components that run at different bus frequencies. The system 100 may be implemented generically and be used in any shared bus architecture, be in systems or VLSI chips.

Figure 3:
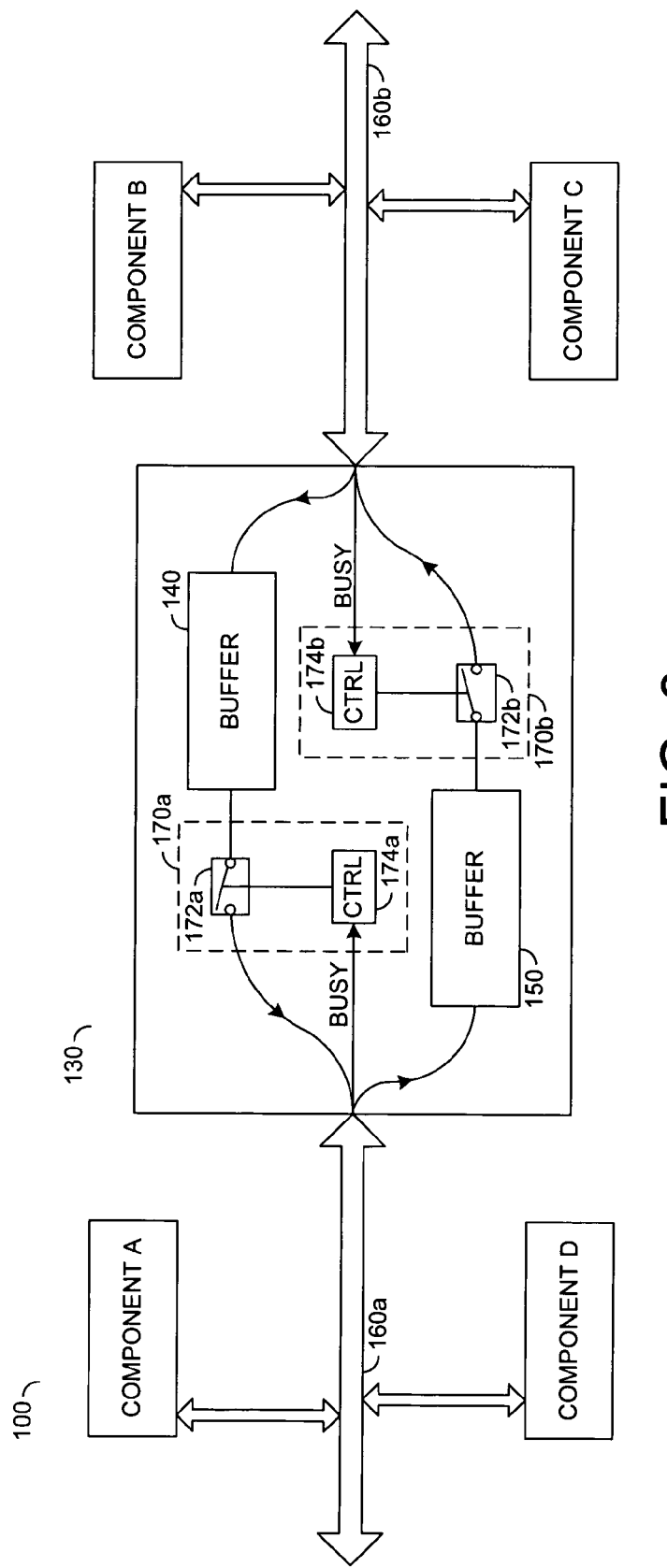
FIG. 3 is a more detailed diagram illustrating the present invention.

Referring to FIG. 3, a more detailed diagram of the system 100 is shown. In particular, additional details of the switch 130 are shown. For example, a control portion 170a is shown between the buffer 140 and the bus segment 160a. A control portion 170b is shown connected between the buffer 150 and the bus segment 160b. The control portion 170a generally comprises a switch portion 172a and a control logic portion 174b. Similarly, the control portion 170b generally comprises a switch portion 172b and a control logic portion 174b.

The control logic portion 174a may receive a bus busy signal (e.g., BUSY) from the bus segment 160a. The signal BUSY generally indicates if the bus segment 160 has traffic (e.g., data, addresses, etc.). The control portion 170a allows data to be transferred from the buffer 140 to the bus segment 160a by closing the switch 172a if the signal BUSY indicates that the bus segment 160a is not busy. If the signal BUSY indicates that the bus segment 160 is busy, then the control portion 170a opens the switch 172a, not allowing data to be presented from the buffer 140. The control portion 170b provides similar operation while the control portion 170a is shown with a switch 172a, other components may be implemented to meet the design criteria of a particular implementation. For example, a tri-state buffer may be implemented to control data flow. The buffer 140 may load information from the bus segment 160b while the buffer 150 loads information from the bus segment 160a. Information (e.g., data, addresses, etc.) may be unloaded from the buffer 140 once the bus segment 160a is not busy. Similarly, data may be unloaded from the buffer 150 once the bus segment 160b is not busy. Portions of data may be loaded and/or unloaded from the buffers 140 and 150 at different times. For example, if the component A needs to send a large piece of data to the component B, a first portion of the data can be loaded into the buffer 140 while a smaller portion of data is being loaded from the component C to the buffer 150. The buffer B may start unloading data to the bus segment 160b, which may interrupt the data being loaded into the buffer 140. After the data is unloaded from the buffer 150, additional data may be loaded into the buffer 140.

As used herein, the term "simultaneously" is meant to describe events that share some common time period but the term is not meant to be limited to events that begin at the same point in time, end at the same point in time, or have the same duration.

While the invention has been particularly shown and described with reference to the preferred embodiments thereof, it will be understood by those skilled in the art that various changes in form and details may be made without departing from the spirit and scope of the invention.

The invention claimed is:

1. An apparatus comprising:
   a first bus segment configured (i) to transfer data in either a first direction or a second direction and (ii) to present a first bus busy signal configured to indicate whether said first bus segment has traffic;
   a second bus segment configured (i) to transfer data in either said first direction or said second direction and (ii) to present a second bus busy signal configured to indicate whether said second bus segment has traffic;
   a first switch portion connected between said first bus segment and said second bus segment, wherein said first switch portion is configured (i) to receive said first bus busy signal, (ii) to receive data from said second bus segment and (iii) to transfer said data received from said second bus segment to said first bus segment when said first bus busy signal indicates said first bus segment has no traffic; and
   a second switch portion connected between said first bus segment and said second bus segment, wherein said second switch portion is configured (i) to receive said second bus busy signal, (ii) to receive data from said first bus segment and (iii) to transfer said data received from said first bus segment to said second bus segment when said second bus busy signal indicates said second bus segment has no traffic, wherein said first switch portion and said second switch portion are configured to transfer data in both said first direction and said second direction simultaneously.

2. The apparatus according to claim 1, wherein said first bus segment is connected to a first plurality of components.

3. The apparatus according to claim 2, wherein said second bus segment is connected to a second plurality of components.

4. The apparatus according to claim 1, wherein:
   said first switch portion is configured to transmit data to said first bus segment when said first bus busy signal is in a first state and hold data for transfer to said first bus segment when said first bus busy signal is in a second state; and
   said second switch portion is configured to transmit data to said second bus segment when said second bus busy signal is in a first state and hold data for transfer to said second bus segment when said second bus busy signal is in a second state.

5. The apparatus according to claim 4, wherein said first switch portion comprises a first plurality of memory cells and said second switch portion comprises a second plurality of memory cells.

6. The apparatus according to claim 1, wherein said first switch portion and said second switch portion are configured as a cross switch.

7. The apparatus according to claim 1, wherein said first switch portion comprises a first buffer and said second switch portion comprises a second buffer.

8. The apparatus according to claim 1, wherein said first bus segment operates at a first frequency and said second bus segment operates at a second frequency.

9. The apparatus according to claim 8, wherein said first frequency is equal to said second frequency.

10. The apparatus according to claim 8, wherein said first frequency is greater than said second frequency.

11. The apparatus according to claim 1, wherein said first switch portion comprises a first control logic, a first buffer and a first switch and said second switch portion comprises a second control logic, a second buffer and a second switch, wherein said first control logic is configured to generate a first control signal in response to said first bus busy signal, said second control logic is configured to generate a second control signal in response to said second bus busy signal, said first switch is configured to connect an output of said first buffer to said first bus segment in response to said first control signal and said second switch is configured to connect an output of said second buffer to said second bus segment in response to said second control signal.

12. An apparatus comprising:
means for presenting a first bus busy signal configured to indicate whether data is being transferred on a first bus segment;
means for presenting a second bus busy signal configured to indicate whether data is being transferred on a second bus segment;
means for transferring data from said second bus segment to said first bus segment, wherein said means for transferring data from said second bus segment is configured (i) to receive said first bus busy signal, (ii) to receive said data from said second bus segment, (iii) to hold said data received from said second bus segment when said first bus busy signal indicates said first bus segment has traffic and (iv) to transfer said data received from said second bus segment to said first bus segment when said first bus busy signal indicates said first bus segment has no traffic; and
means for transferring data from said first bus segment to said second bus segment, wherein said means for transferring data from said first bus segment is configured (i) to receive said second bus busy signal, (ii) to receive said data from said first bus segment, (iii) to hold said data received from said first bus segment when said second bus busy signal indicates said second bus segment has traffic and (iv) to transfer said data received from said first bus segment to said second bus segment when said second bus busy signal indicates said second bus segment has no traffic, wherein data can be transferred simultaneously (i) from said first bus segment to said second bus segment and (ii) from said second bus segment to said first bus segment.

13. A method for transferring data and/or addresses comprising the steps of:
(A) transferring data in either a first direction or a second direction on a first bus segment and presenting a first bus busy signal configured to indicate whether said first bus segment has traffic;
(B) transferring data in either said first direction or said second direction on a second bus segment and presenting a second bus busy signal configured to indicate whether said second bus segment has traffic;
(C) transferring data from said second bus segment to said first bus segment by (i) receiving said first bus busy signal, (ii) receiving said data from said second bus segment and (iii) transferring said data received from said second bus segment to said first bus segment when said first bus busy signal indicates said first bus segment has no traffic; and
(D) transferring data from said first bus segment to said second bus segment by (i) receiving said second bus busy signal, (ii) receiving said data from said first bus segment and (iii) transferring said data received from said first bus segment to said second bus segment when said second bus busy signal indicates said second bus segment has no traffic, wherein said data can be transferred in both directions simultaneously.

14. The method according to claim 13, wherein said data comprises addresses.

15. The method according to claim 13, wherein:
the step (C) further comprises holding said data received from said second bus segment when said first bus busy signal indicates said first bus segment has traffic; and
the step (D) further comprises holding said data received from said first bus segment when said second bus busy signal indicates said second bus segment has traffic.

16. The method according to claim 15, wherein:
holding said data received from said second bus segment comprises storing said data received from said second bus segment in a first buffer; and
holding said data received from said first bus segment comprises storing said data received from said first bus segment in a second buffer.

17. The method according to claim 16, wherein:
transferring said data received from said second bus segment to said first bus segment comprises connecting an output of said first buffer to said first bus segment in response to said first bus busy signal; and
transferring said data received from said first bus segment to said second bus segment comprises connecting an output of said second buffer to said second bus segment in response to said second bus busy signal.

18. The method according to claim 17, wherein:
transferring said data received from said second bus segment to said first bus segment further comprises generating a first control signal in response to said first bus busy signal; and
transferring said data received from said first bus segment to said second bus segment further comprises generating a second control signal in response to said second bu busy signal.

19. The method according to claim 18, wherein:
transferring said data received from said second bus segment to said first bus segment further comprises controlling a first switch connected between said first buffer and said first bus segment in response to said first control signal; and
transferring said data received from said first bus segment to said second bus segment further comprises controlling a second switch connected between said second buffer and said second bus segment in response to said second control signal.

20. The method according to claim 19, wherein said first switch and said second switch comprise tri-state buffers.

* * * * *